UNITED STATES PATENT OFFICE.

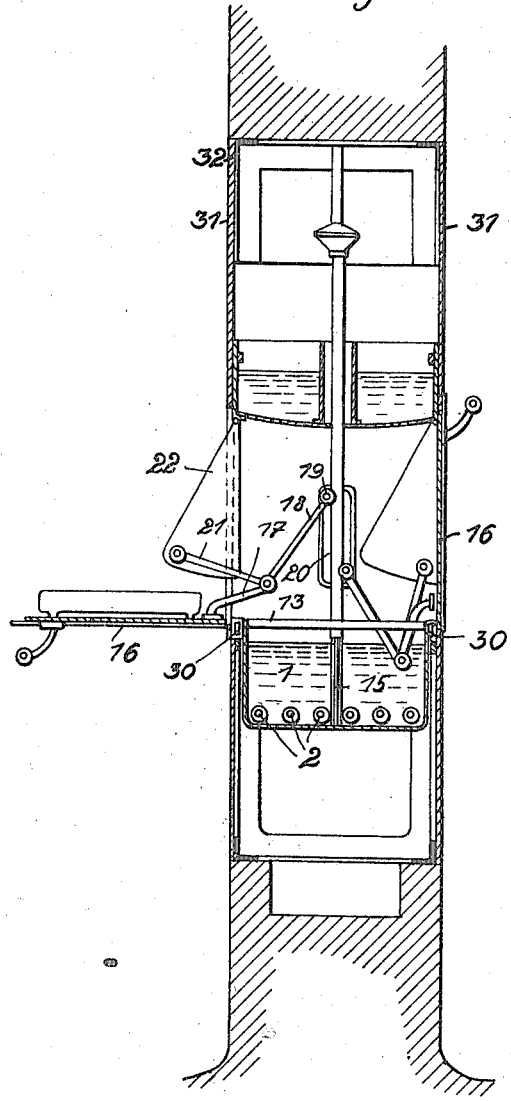
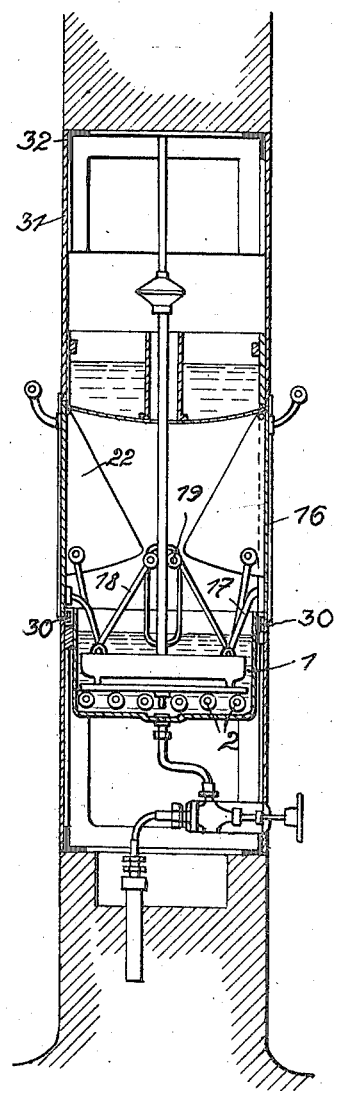

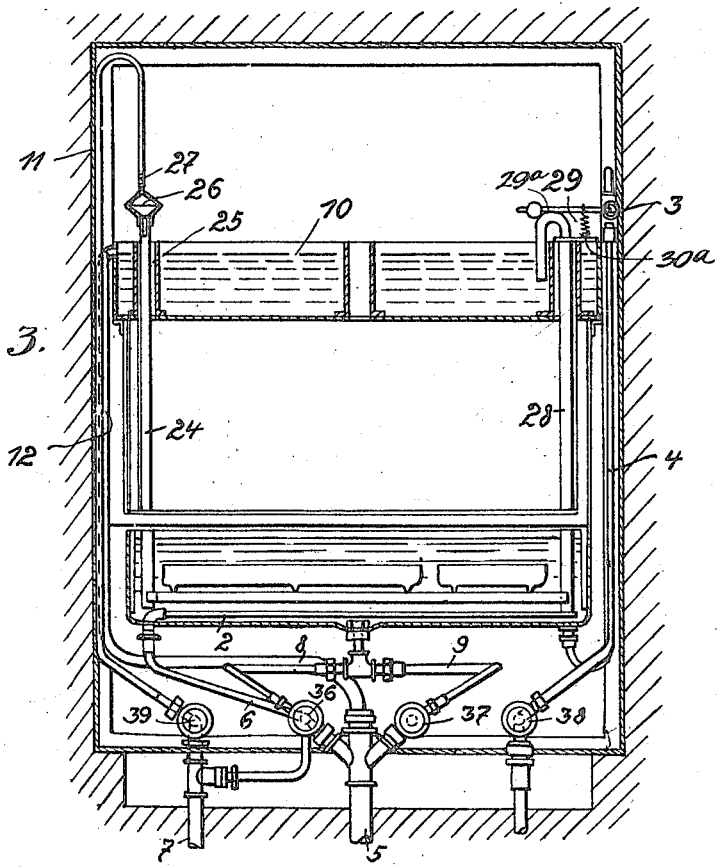
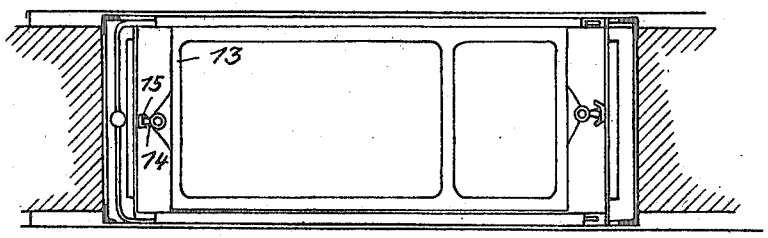

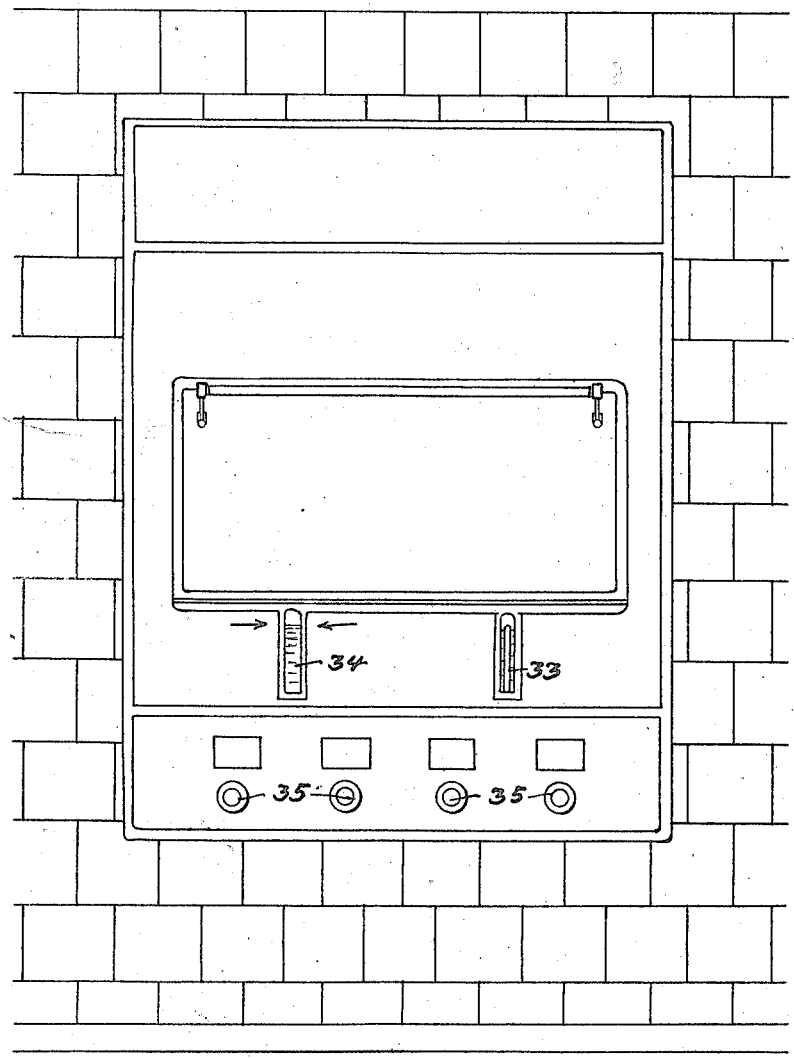

CARL SCHÄRER, OF PANKOW, BERLIN, GERMANY, ASSIGNOR TO ALLGEMEINE KRANKENHAUS-EINRICHTUNGS-GESELLSCHAFT M. B. H., OF BERLIN, GERMANY.

APPARATUS FOR STERILIZING SURGICAL INSTRUMENTS AND ANY OTHER OBJECTS.

1,249,514.   Specification of Letters Patent.   Patented Dec. 11, 1917.

Application filed March 1, 1915. Serial No. 11,409.

*To all whom it may concern:*

Be it known that I, CARL SCHÄRER, a citizen of Switzerland, residing at No. 113 Hartwigstrasse, Pankow, Berlin, Germany, have invented certain new and useful Improvements in Apparatus for Sterilizing Surgical Instruments and Any other Objects, of which the following is a specification.

My invention relates to improvements in apparatus for sterilizing surgical instruments and other objects, such as for instance, receptacles, casings, surgical sewing-cord by the aid of boiling water.

In general, it is well known to employ boiling water for the purpose of sterilizing surgical instruments, implements, casings and receptacles, sewing cord, rubber-articles and the like, the heat employed for boiling the water having been derived from steam, electricity, petroleum, wood, coal or any other fuel. It has also been known and practised before to inclose the sterilizing apparatus within a digester for the purpose of carrying off the surplus of vapors generated by the sterilizing apparatus, whereby the surrounding space is kept free from moist vapors injurious and disagreeable to the attendants.

The object of my invention is to obtain a speedy and entirely reliable sterilization and to do away with the several objectionable inconveniences connected with the sterilizing devices hitherto in use.

To obtain such object I employ a sterilizing apparatus, which, is preferably located within a partition between the sterilizing room and the operating-room, and is kept perfectly steam-tight during the process of sterilization. The apparatus contains a cooling device, owing to which the escape of moist vapors and the resulting loss of sterilizing fluid is substantially eliminated, either during the act of introducing the objects to be treated, or during removing said objects; also the drop in temperature of the sterilizing fluid due to said introduction or removal of objects is equally and effectively avoided.

The instruments and other articles to be sterilized are placed in perforated cups carried by a lifting tray which, being connected to the doors of the sterilizing apparatus automatically immerses the said cups into and lifts them out of the sterilizing fluid, said doors being so arranged and operated to open and close in a vertical plane. For this purpose, the said lifting tray is positively connected to the said vertically swinging doors by means of levers, which as the doors open, simultaneously cut off the supply of heat and admit cooling fluid to said lifting tray, such cooling fluid being led from the cooling device of the sterilizing apparatus and temporarily supplied to cool the said lifting tray.

Besides of preventing the escape of moist vapors into the surrounding space, as described, and besides of automatically performing the submersion and emersion of the tray which carries the objects to be sterilized, a further considerable advantage is obtained which consists in simultaneously heating and sterilizing the doors by the steam which fills the hollow space of the apparatus, the inside of which serve to support the cups which contain the objects to be sterilized. Another advantage derived from the construction of the apparatus according to my invention consists in that a perfectly sterilized diaphragm or partition is established between the operating room and the sterilizing room. The performance of opening and closing the doors may be brought about by the aid of the elbow or the foot, thereby excluding any danger that infectious matter might be transferred by any unclean touching.

To make my invention perfectly understood, I have illustrated one embodiment of the same in the accompanying drawings which serve as an example as to how my invention may be carried into practice.

In the said drawings,

Figure 1 shows a cross-section of the sterilizing apparatus, with the doors in their open position;

Fig. 2 is a similar cross-section with the doors in their closed position;

Fig. 3 is a longitudinal section of the apparatus;

Fig. 4 is a plan of the same and

Fig. 5 shows a front-elevation of the same.

In the said drawings, 1 is a receptacle destined to receive the water for boiling the same; 2 is a coiled tube conducting heating fluid such as steam, the said coil being located at the bottom of the receptacle 1. Steam is supplied into said coil by a feed-pipe 4 provided with a self-closing shut-off valve 3. The discharge of the steam is made through a discharge-pipe 6 to the exhaust 5, as shown in Fig. 3. Water may be supplied to said receptacle 1 by means of the supply-pipe 8 and a water-conduit, 7. The discharge of the water is made from the receptacle 1 through a discharge-pipe 9 to the exhaust 5.

Within the upper portion of the sterilizing apparatus a cooling vessel 10 is located, into which water is supplied from the water-conduit through a supply-pipe 11; to maintain the contents of said vessel 10 at a constant level, an overflow-pipe 12 has been provided discharging into the exhaust 5.

Within the said receptacle 1, a lifting tray 13 has been provided to slide in a vertical direction, having slide-rails 15 adapted to be guided in guide-ways of said sterilizing apparatus, and connected to the doors 16 of said apparatus by a set of levers. The said connection is so calculated, that, as the doors are being closed, the said tray 13 is lowered down to the bottom of the receptacle 1, whereas, by opening the said doors 16, the said tray is lifted from the fluid within the said receptacle 1. The means by which the tray 13 is thus lowered or immersed into the sterilizing fluid and raised or lifted out of said fluid, consists of a pair of levers 17, each of which may be fixed to the inside of the door, and of a movable arm 18, one end of which is linked to the fixed pair of levers 17 and the other free end of which is guided by a projecting pin 19 within a vertical guide-way 20 rigidly connected to the said lifting tray 13. A second swinging lever 21, which is similarly linked to the fixed arm 17 of the door 16, engages a steam-escape hood 22, the connection being so calculated, that, as the door is closed, the said hood is swung to the inside of the casing of the apparatus, while, on opening the door, the said hood is swung to the outside. Having reached the said latter position, the said hood will cover the rear part of the door, which, by this time, has assumed a horizontal position, and the escape of moist vapors from the sterilizing apparatus is thereby prevented.

For the purpose of cooling the said lifting tray 13, the same is constructed hollow and provided with a tube 24, which also serves to connect the guide-ways 20 already mentioned above. The said tube 24 leads up through a guiding member 25 of the cooling vessel 10 and carries a funnel 26 at its upper end, the said funnel, however, being not open but covered by a roof-shaped hood having a central aperture. I thereby provide means whereby the fluid, on being discharged through the lateral ports 27 of the pipe 11, will run beyond said roof-shaped hood and flow into the cooling vessel 10 as long as the tray 13 keeps its lowered position (Figs. 2 and 3). But as soon as the said tray 13 has been raised by opening the door, the said funnel 26 will slide over the aperture in the end of pipe 11 and the cooling fluid, henceforth, will not flow into the vessel 10, but into the hollow space of the tray 13, from which the fluid will be exhausted through a pipe 28 at the opposite end of the hollow tray and run into the cooling vessel 10.

In order to simultaneously obtain, on closing the door of the apparatus, the shutting off of the heating source for heating the sterilizing fluid, a selfacting valve 3 has been provided within the steam-supply-pipe 4, as mentioned above. Said valve may be provided with a lever arm $29^a$, which is so located with relation to the discharge-pipe 28 of the tray 13, as to be engaged by and rotated in a clockwise direction by said pipe in the ascent of the tray, whereby opening the valve while, as the said tray returns down, the said valve 5 is automatically closed by a helical spring 29, said spring being shown mounted under tension between the lever arm $29^a$ and a suitable part $30^a$ of the tank 10.

A hollow frame 30 serves simultaneously as an abutment for each of the two doors 16 and as a conductor for a cooling fluid which is constantly flowing through the ducts of said frame to prevent the formation of moist vapors.

The casing of the apparatus consists of the lateral sheet-metal sides 31, which, by the aid of angular frames 32, are secured within the wall between the sterilizing room and the operating room. The front side of the apparatus carries a thermometer 33 and a water-gage 34 for controlling the temperature and the level of the sterilizing fluid within the apparatus. From the front of the apparatus there are further projecting the handles 35 of four valves; one of which valves, 36, serves to control the supply and the other valve 37 to control the discharge of the sterilizing fluid with respect to the receptacle 1, while the valve 38 controls the supply of steam and valve 39 the supply of cooling fluid to the apparatus.

It will be seen from the foregoing description, that by the use of the construction and arrangement of parts of the sterilizing apparatus according to my invention, the process of sterilizing surgical instruments and similar other objects and matter may be performed speedily and conveniently and with as little supply as possible of steam and water.

Instead of constructing the apparatus within the partition between two rooms, it might be supported by any other suitable basement or bracket, the working of the apparatus being the same in either case.

I claim as my invention:

1. In apparatus for sterilizing surgical instruments and other objects and matter, the combination, with a steam-tight casing, of a receptacle for receiving the sterilizing fluid, a tray supporting the objects to be sterilized, ducts for conducting water through said tray, levers connecting said tray one side to guides for lifting and lowering the tray and the other side to swinging hoods adapted to be turned inside and outside of the doors, and of a water-distributing device for making cool water flow through the tray when raised and stopping said water flow when the tray descends.

2. In a sterilizing apparatus, a casing provided with a door hinged thereto to move outwardly therefrom, a hood pivotally mounted on the casing opposite to the hinged connection for the door to partially close the door opening, said hood being concealed within the casing by the door when the door is moved to its closed position, an arm fixed to said door, and a swinging lever connecting the end of the fixed arm with the hood to move the hood to its closed position as the door is closed and to its outwardly directed position to prevent the escape of vapors from the interior of the casing when the door is opened.

3. In a sterilizing apparatus, a casing provided with a door hinged thereto to move outwardly therefrom, a hood pivotally mounted on the casing opposite to the hinged connection for the door to partially close the door opening, said hood being concealed within the casing by the door when the door is moved to its closed position, an arm fixed to said door, a swinging lever connected to the end of the fixed door arm and the hood to move the hood to its concealed and exposed positions simultaneously with the movement of the door to its closed and opened positions, a sterilizing fluid receptacle, a material receiving tray coöperating with the sterilizing receptacle, means to raise and lower said tray, and a link connecting the fixed arm of the door with the tray actuating means whereby the tray may be submersed in the fluid of the sterilizing receptacle when the door is closed and may be emerged from the fluid simultaneously with the opening of the door and the outward movement of the hood.

4. In a sterilizing apparatus, a casing provided with a door and a sterilizing receptacle, a vertically movable tray mounted in the casing and adapted to be submerged in fluid contained in the sterilizing receptacle when the door is closed, the movable tray being provided with elevating and guiding instrumentalities whereby the tray may be elevated from the sterilizing receptacle by the movement of the door in one direction.

5. A sterilizing apparatus comprising a casing having a door, a sterilizing receptacle, means to heat fluid contained in the receptacle, a cooling vessel mounted in the casing above the sterilizing receptacle, means to supply cool fluid to the cooling vessel, a swinging hood carried by the casing and adapted to partially close the door opening of the casing, means to connect the door with the hood whereby the hood may be moved outwardly from the casing over the door when the latter is moved to its opened position to prevent the escape of vapors from the heated fluid of the sterilizing receptacle and to direct the vapors to the cooling vessel to condense the vapors.

6. A sterilizing apparatus comprising a casing having a door, a sterilizing receptacle, means to heat fluid contained in the receptacle, a cooling vessel mounted in the casing above the sterilizing receptacle, means to supply cool fluid to the cooling vessel, a tray mounted in the casing and provided with means whereby the tray may be moved simultaneously with the movement of the casing door, and means to automatically cut off the heating means to the sterilizing receptacle when the tray is moved to one position by the operation of the door.

7. A sterilizing apparatus comprising a casing having a door, a sterilizing receptacle, means to heat fluid contained in the receptacle, a cooling vessel mounted in the casing above the sterilizing receptacle, means to supply cool fluid to the cooling vessel, a tray mounted in the casing and provided with means whereby the tray may be moved simultaneously with the movement of the casing door, means to cut off the supply of cool fluid directly to the cooling vessel and to pass it around the tray and thereafter to the cooling vessel when the tray is moved to one position by the operation of the door, and means actuated by the movement of the tray in one direction to cut off the heating means to the sterilizing receptacle.

8. A sterilizing apparatus comprising a casing, a tray movably mounted therein, a cooling vessel mounted in the casing and provided with a passage way, a fluid conductor mounted in said passage way and adapted to be moved longitudinally by the movement of the tray, means to connect the fluid conductor with means to cool the tray, one end of the fluid conductor being provided with a bulbous coupling, a pipe having a nozzle to supply fluid to the cooling vessel, the end of said pipe terminating within the bulbous end of the conductor, and means to move said tray within the casing to cause the bulbous coupling to pass over said nozzle to preclude the direct flow of fluid to the cooling vessel and permit the fluid to flow through the fluid conductor around the tray.

In testimony whereof I affix my signature in presence of two witnesses.

CARL SCHÄRER.

Witnesses:
  HENRY HASPER,
  WOLDEMAR HAUPT.